(12) United States Patent
Koizumi (10) Patent No.: US 9,963,044 B2
(45) Date of Patent: May 8, 2018

(54) PARKING ASSIST SYSTEM

(71) Applicant: SUZUKI MOTOR CORPORATION, Hamamatsu-shi, Shizuoka (JP)

(72) Inventor: Dai Koizumi, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 87 days.

(21) Appl. No.: 15/200,637

(22) Filed: Jul. 1, 2016

(65) Prior Publication Data

US 2017/0008421 A1    Jan. 12, 2017

(30) Foreign Application Priority Data

Jul. 8, 2015   (JP) .................................. 2015-136870

(51) Int. Cl.
| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B60L 15/20* | (2006.01) |
| *B60L 3/00* | (2006.01) |
| *B60L 3/04* | (2006.01) |
| *B60L 11/14* | (2006.01) |

(52) U.S. Cl.
CPC ............ *B60L 15/20* (2013.01); *B60L 3/0061* (2013.01); *B60L 3/04* (2013.01); *B60L 11/14* (2013.01); *B60L 2200/12* (2013.01); *B60L 2240/12* (2013.01); *B60L 2240/14* (2013.01); *B60L 2240/20* (2013.01); *B60L 2240/22* (2013.01); *B60L 2240/32* (2013.01); *B60L 2240/36* (2013.01); *B60L 2250/12* (2013.01); *B60L 2250/16* (2013.01); *B60L 2250/24* (2013.01); *B60Y 2200/91* (2013.01); *B60Y 2200/92* (2013.01); *B60Y 2300/06* (2013.01); *Y02T 10/645* (2013.01); *Y02T 10/70* (2013.01); *Y02T 10/7077* (2013.01); *Y02T 10/72* (2013.01); *Y02T 10/7275* (2013.01)

(58) Field of Classification Search
CPC ........... B60L 3/0061; B60L 3/04; B60L 11/14
USPC .......................................................... 701/22
See application file for complete search history.

(56) References Cited

FOREIGN PATENT DOCUMENTS

| | | |
|---|---|---|
| JP | 2004-140967 A | 5/2004 |
| JP | 2012-100397 A | 5/2012 |
| JP | 2012-162095 A | 8/2012 |

*Primary Examiner* — Maceeh Anwari
(74) *Attorney, Agent, or Firm* — Stein IP, LLC (57) ABSTRACT

There is provided a parking assist system. A motor drives a front wheel. A motor control device controls an output of the motor. A changeover switch changes over a control mode for the motor to an assist mode different from a normal traveling mode. The motor control device is configured to control the output of the motor depending on operation of the changeover switch at the assist mode.

4 Claims, 7 Drawing Sheets

PARKING ASSIST SYSTEM

CROSS-REFERENCE TO RELATED APPLICATIONS

The disclosure of Japanese Patent Application No. 2015-136870 filed on Jul. 8, 2015, including specification, drawings and claims is incorporated herein by reference in its entirety.

TECHNICAL FIELD

The present invention relates to a parking assist system, and in particular, to a parking assist system to be applied to vehicles having a center stand.

BACKGROUND

In electric automatic two-wheeled vehicles or hybrid automatic two-wheeled vehicles, a vehicle is known, in which forward and backward movements thereof can be changed over to each other depending on a condition of the vehicle (see Patent Documents 1 to 3). In automatic two-wheeled vehicles described in Patent Documents 1 to 3, a motor for driving a rear wheel is provided, and also a switch for changing over between forward and backward movements of the vehicle is provided on a handle bar. For example, when it is desired to move the vehicle backward, the switch is switched into to a backward movement mode so that a rear wheel thereof can be rotated reverse by the motor.

Patent Document 1: Japanese Patent Application Publication No. 2004-140967A

Patent Document 2: Japanese Patent Application Publication No. 2012-162095A

Patent Document 3: Japanese Patent Application Publication No. 2012-100397A

In automatic two-wheeled vehicles described in Patent Documents 1 to 3, processing (direction-changing) of the vehicle can be assisted by driving the motor, but a measure of reducing a burden to an occupant upon parking is not considered. For example, in a case of a vehicle having a center stand, a rear wheel needs to be floated upon parking, so that a large burden is applied to the occupant in order to erect the center stand.

SUMMARY

The present invention has been made keeping in mind the above problems, and an object thereof is to provide a parking assist system in which a burden to an occupant upon parking can be reduced.

According to an aspect of the embodiments of the present invention, there is provided a parking assist system, comprising: a motor for driving a front wheel; a motor control device for controlling an output of the motor; and a changeover switch for changing over a control mode for the motor to an assist mode different from a normal traveling mode, wherein the motor control device is configured to control the output of the motor depending on operation of the changeover switch at the assist mode.

According to this configuration, when it is desired to park a vehicle, the changeover switch can be switched to drive the front wheel. Thus, for example, forward and backward movements of the vehicle upon parking can be assisted by the motor. As a result, a burden to an occupant can be reduced.

In the parking assist system, the changeover switch may comprise a forward movement switch for driving the front wheel to be rotated forward by the motor and a backward movement switch for driving the front wheel to be rotated reverse by the motor, and the output of the motor may be controlled depending on operation of the forward movement switch or backward movement switch.

According to this configuration, the forward movement switch and the backward movement are operated to drive the front wheel, thereby controlling the vehicle to be moved forward or backward. Thus, when the vehicle is parked on a narrow road, handling of the vehicle can be easily adjusted by steering the vehicle using forward and backward movements.

The parking assist system according may further comprise a brake sensor for detecting an operation amount of a brake lever, and the motor control device may be configured to control the output of the motor depending on an output of the brake sensor.

According to this configuration, a speed of the vehicle can be adjusted by a typical operation of the brake lever. Accordingly, operations of moving the vehicle forward or backward or stopping the vehicle can be easily performed.

In the parking assist system, the parking assist system may be used in a vehicle having a center stand configured to support the vehicle while floating a rear wheel thereof and may further comprise a center stand position detection unit for detecting a position of the center stand, and the motor control device may be configured to control the output of the motor depending on a detected result of the center stand position detection unit.

According to this configuration, a driving power of the motor is adjusted depending on a position of the center stand, and accordingly, a parking motion of an occupant can be assisted depending on a force required to support the vehicle by the center stand.

In the parking assist system, the motor control device may be configured to increase the output of the motor when the center stand is transited from a supporting start position, at which supporting of the vehicle is started, to a supporting position, at which the vehicle is supported.

In this case, a driving power of the motor can be increased at a timing at which a larger force is required during a motion for supporting the vehicle by the center stand, thereby allowing a suitable assist to be provided.

In the parking assist system, the motor control device may be configured to increase the output of the motor when the center stand is transited from a supporting position, at which the vehicle is supported, to a released position, at which supporting of the vehicle is released.

In this case, a driving power of the motor can be increased at a timing at which a larger force is required during a motion for releasing supporting of the vehicle by the center stand, thereby allowing a suitable assist to be provided.

The parking assist system may further comprise a speed sensor for detecting a speed of the vehicle, and the motor control device may be configured to stop the output of the motor, if a state where the vehicle speed detected by the speed sensor is lower than a predetermined value is kept during a predetermined period of time.

According to this configuration, the motor can be automatically stopped when the motor does not need to be driven. Thus, it is possible to prevent an overload from being exerted on the motor or a battery from being wasted.

According to the above described parking assist system, a front wheel can be driven by a motor in a control mode different from a normal traveling mode, and as a result, a burden to an occupant upon parking can be reduced.

DETAILED DESCRIPTION OF THE EMBODIMENTS

Now, a parking assist system according to the present embodiment will be described with reference to the accompanying drawings. Meanwhile, although an example in which the parking assist system according to the present invention is applied to an automatic two-wheeled vehicle will be described, the present invention is not limited to configurations as illustrated below, but appropriate modifications thereof may be made. For example, the present invention may be applied to any other types of two-wheeled vehicles. Further, the present invention may be applied to vehicles other than two-wheeled vehicles and thus can be applied to, for example, buggy-type automatic three-wheeled vehicles or automatic four-wheeled vehicles. Further, although in the present embodiment, a case where the parking assist system is applied to hybrid automatic two-wheeled vehicles in which an electric motor in addition to an engine is employed as a drive source will be described, the present invention is not limited to such a configuration. For example, automatic two-wheeled vehicles to which the parking assist system is applicable may include automatic two-wheeled vehicles, in which only an engine is employed as a drive source, or electromotive-type two-wheeled vehicles, in which only an electric motor is employed as a drive source.

Figure 1:
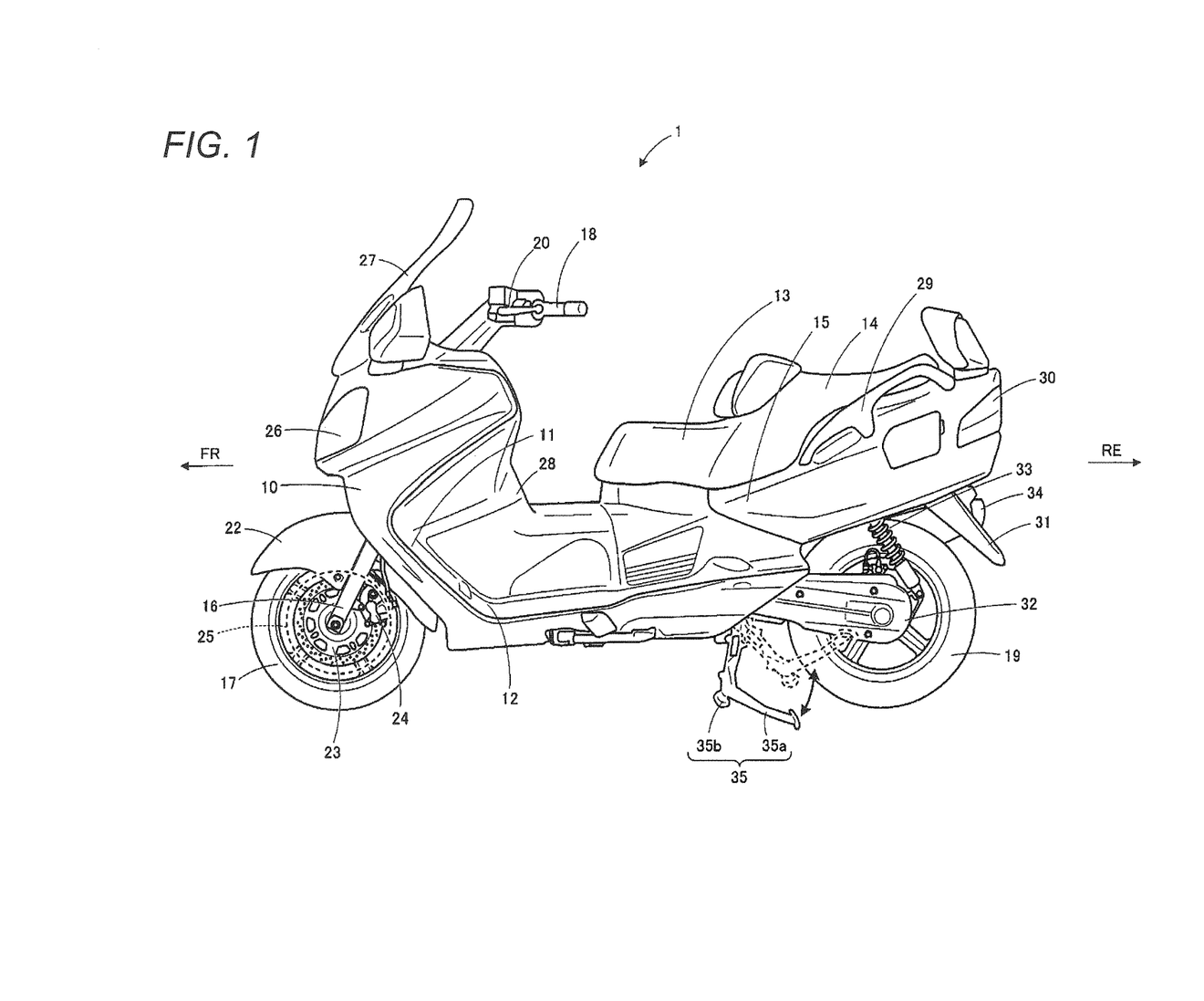
FIG. 1 is a left side view of an automatic two-wheeled vehicle according to the present embodiment.

First, a schematic general configuration of the automatic two-wheeled vehicle according to the present embodiment will be described with reference to FIG. 1. FIG. 1 is a left side view of the automatic two-wheeled vehicle according to the present embodiment. Meanwhile, in the following drawings, a front side of a vehicle is indicated by an arrow FR, a rear side of the vehicle is indicated by an arrow RE, a left side of the vehicle is indicated by an arrow L and a right side of the vehicle is indicated by an arrow R.

As shown in FIG. 1, the automatic two-wheeled vehicle 1 according to the present embodiment is a hybrid scooter-type automatic two-wheeled vehicle in which an electric motor in addition to an engine is employed as a drive source.

The automatic two-wheeled vehicle 1 is configured so that various covers as vehicle exterior parts are mounted on a vehicle frame (not shown) made of steel or aluminum alloy.

The automatic two-wheeled vehicle 1 has a front cowl 10 provided to protect the front of a rider and a leg shield 11 provided on a rear surface side of the front cowl 10 to protect leg portions of the rider. Further, a step board 12 extends rearward from a lower end of the leg shield 11, and also a rider seat 13 is provided in the rear of the step board 12 and a seat cowl 15 is provided below a pillion seat 14.

On a front side of the vehicle, a pair of front forks 16 are supported to be swingable in right and left directions via a steering shaft (not shown) provided on a head pipe (not shown). Handle bars 18 for steering a front wheel 17 are provided above the pair of front forks 16. The handle bar 18 on the left side of the vehicle is provided with a brake lever 20 for a rear wheel 19 and the handle bar 18 on the right side of the vehicle is provided with a brake lever 21 (see FIG. 3) for the front wheel 17. Although the details will be described below, the handle bars 18 are provided with various switches constituting a parking assist system 40 (see FIG. 2) according to the present embodiment.

On a lower portion of the pair of front forks 16, the front wheel 17 is rotatably supported and also a front fender 22 covering an upper portion of the front wheel 17 is installed. The front wheel 17 is provided with a brake disk 23 and a brake caliper 24 for sandwiching the brake disk 23. Also, the front wheel 17 is provided with a motor 25, which is a drive source. Although the details will be described below, the motor 25 is configured to rotationally drive the front wheel 17, independent of driving the rear wheel 19.

A headlamp 26 is provided on a front surface of the front cowl 10 and a windscreen 27 for blocking a wind is provided above the headlamp 26. A fuel tank (not shown) is received inside a center console 28 located at the center of the vehicle. On the rear of the fuel tank, the rider seat 13 and the pillion seat 14 are installed to be connected to each other above the seat cowl 15. A luggage space (not shown) in which a helmet or the like can be contained is provided on a back surface side of the rider seat 13.

Grab bars 29 for a pillion passenger are provided on lateral sides of the seat cowl 15 near to the pillion seat 14. A tail lamp 30 and a rear fender 31 are provided on a rear portion of the seat cowl 15. Also, an engine (not shown) mounted on the vehicle frame (not shown) is received inside the seat cowl 15.

A transmission case 32, which serves as a swing arm, is connected to be swingable in upward and downward directions below a rear portion of the vehicle, and a suspension 33 for absorbing a shock on the rear wheel is provided between the vehicle frame (not shown) and the transmission case 32. A belt-type continuously variable transmission in which a drive belt is wound around a driving pulley on the engine and a driven pulley on the rear wheel 19 is received inside the transmission case 32. This transmission is shifted by varying a winding radius of the drive belt. The rear wheel 19 is rotationally driven as a power from the engine is transferred thereto via the drive belt. Also, the rear wheel 19 is configured to be rotationally driven by an electric motor, not shown.

The engine is suspended on the vehicle frame in a state where a cylinder is tilted forward to be generally oriented in a horizontal direction. The engine is configured so that air is introduced therein via an intake pipe (not shown) and also the air is mixed with fuel in a fuel injection device 44 (see FIG. 2) and then supplied to a combustion chamber. An exhaust gas after combustion in the combustion chamber passes through an exhaust pipe (not shown) extending toward the lower side of the engine and then is discharged though a muffler 34. Heat from each part of the engine is cooled by a radiator (not shown) arranged inside the front cowl 10 on the front side of the vehicle.

Also, a center stand 35 is provided below the transmission case 32. The center stand 35 is attached to be swingable about a base end thereof, which is located toward the transmission case 32, as a fulcrum. The center stand 35 has a generally L shape, as viewed from the side, which extends downward from the transmission case 32 and also is bent toward a rear side of the vehicle at the middle thereof. More specifically, the center stand 35 is constituted of a bent portion 35a extending downward from the transmission case 32 and bent toward the rear side of the vehicle, and a protrusion portion 35b protruding slightly forward and downward from a bent site on the bent portion 35a. Although the details will be described below, the bent portion 35a serves as a trod portion for allowing an occupant to apply his weight thereto upon parking, and the protrusion portion 35b serves as a support portion for supporting the vehicle.

Meanwhile, conventionally, in automatic two-wheeled vehicles in which a rear wheel is driven by a motor, a vehicle exists in which a driving direction of the motor can be changed over by a switch. For example, when it is desired to move the vehicle backward, the switch is switched into a backward movement mode so that the motor can be rotated reverse. On the other hand, when it is desired to move the vehicle forward, the switch is switched into a forward movement mode so that the motor can be rotated forward. In such an automatic two-wheeled vehicle, it is possible to preform handling adjustment of the vehicle, i.e., direction-changing of the vehicle, by steering the vehicle using forward and backward movements, for example, during parking or the like.

However, the conventional automatic two-wheeled vehicle described above realizes assisting the handling adjustment of the vehicle, but fails to reduce a burden upon parking of a vehicle having a center stand. Specifically, as shown in FIG. 1, the center stand 35 is configured to be positioned below the transmission case 32 while being spaced from a ground surface during a normal traveling, but during parking, is configured to support the vehicle in a state where a distal end thereof is in contact with the ground surface to float the rear wheel 19 from the ground surface. In this case, a large force is required in order to float the rear wheel 19 from the ground surface. In particular, when a vehicle having a large weight is moved or when a person unskilled in operation moves a vehicle, operation of the center stand 35 is a large burden to an occupant.

Accordingly, the present inventors have arrived at the present invention, based on the idea that the front wheel 17 is always in contact with the ground surface when the vehicle is supported by erecting the center stand 35. Namely, the gist of the present invention is to provide a parking assist system 40 (see FIG. 2) for assisting to support the vehicle by the center stand 35 and to release supporting, by driving the front wheel 17 by the motor 25 upon parking. Thus, for example, even when a vehicle having a large weight is moved or when a person unskilled in operation moves a vehicle, operation of the center stand 35 upon parking can be easily performed.

Figure 2:
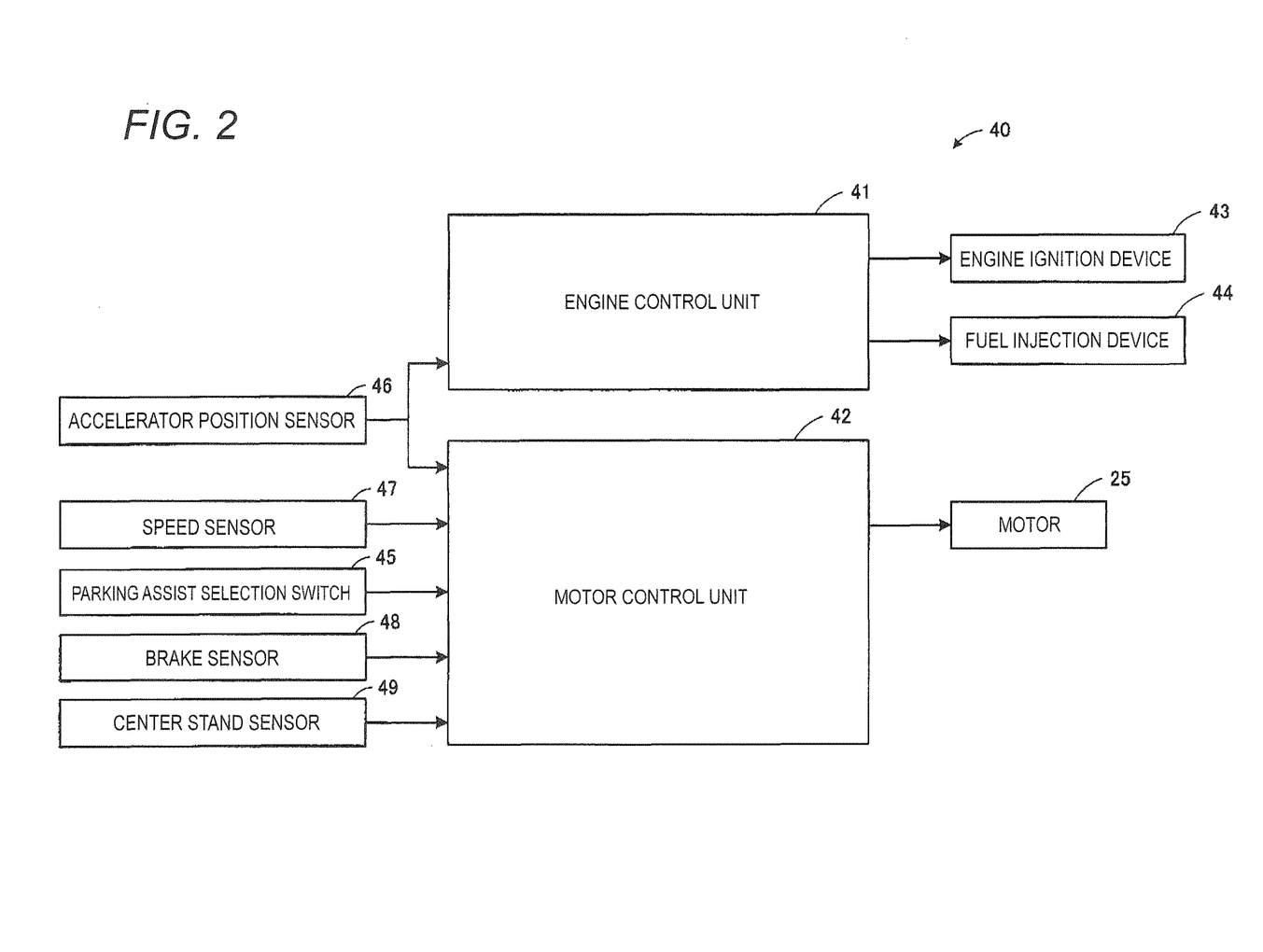
FIG. 2 is a view showing a schematic configuration of a parking assist system according to the present embodiment.

Next, a configuration of the parking assist system according to the present embodiment will be described with reference to FIG. 2. FIG. 2 is a view showing a schematic configuration of a parking assist system according to the present embodiment. Meanwhile, the parking assist system according to the present embodiment is not limited to the following configuration, but can be appropriately modified.

As shown in FIG. 2, the parking assist system 40 according to the present embodiment includes an engine control unit 41, a motor control unit 42, an engine ignition device 43, a fuel injection device 44, a parking assist selection switch 45 and the motor 25. Also, in addition to the above components, the parking assist system 40 has various sensors for detecting a condition of the vehicle. Various sensors can include an accelerator position sensor 46, a speed sensor 47, a brake sensor 48, a center stand sensor 49 and the like. Meanwhile, the present invention is not limited to the sensors listed herein, and thus may have a configuration having other sensors.

The engine control unit 41 is constituted of a processor for executing various processes in the engine, a memory and the like. The memory is constructed by storage media, such ROM (Read Only Memory) or RAM (Random Access Memory) depending on the use thereof. Control programs for controlling each part of the engine and the like are stored in the memory. The engine control unit 41 decides a condition of the vehicle through various sensors provided in the vehicle and then performs controls, such as ignition timing of the engine ignition device 43 or fuel injection amount of the fuel injection device 44.

The motor control unit 42 forms a motor control device according to the present embodiment. The motor control unit 42 decides a condition of the vehicle through various sensors provided in the vehicle and controls driving of the motor 25. Thus, rotational driving of the front wheel 17 is controlled. In addition, a plurality of control modes exist in the motor 25, and the control modes for the motor 25 are configured to be changed over as the occupant operates the parking assist selection switch 45. The motor control unit 42 drives the motor 25 in accordance with a mode selected by operation of the parking assist selection switch 45. The parking assist selection switch 45 will be described below.

The engine ignition device 43 performs ignition at a predetermined timing based on an ignition signal outputted from the engine control unit 41, so that a fuel-air mixture in the combustion chamber is fired. The fuel injection device 44 is configured as a fuel injector, for example, and injects fuel at optimal injection amount, injection time period and timing in response to an instruction from the engine control unit 41.

The accelerator position sensor 46 detects an accelerator opening degree when the occupant operates a throttle. The accelerator opening degree detected by the accelerator position sensor 46 is outputted to the engine control unit 41 to be used in fuel injection and ignition controls. In addition, the accelerator opening degree is also outputted to the motor control unit 42 to be used to control driving of the motor 25. The speed sensor 47 detects a speed of the vehicle and outputs the speed to the motor control unit 42. The brake sensor 48 detects an operation amount of a brake lever 20 operated by the occupant and outputs the operation amount to the motor control unit 42. The center stand sensor 49 detects a position of the center stand 35 and outputs the position to the motor control unit 42.

The center stand sensor 49 forms a center stand position detection means according to the present embodiment. Meanwhile, a configuration for detecting a position of the center stand 35 is not particularly limited. For example, the position of the center stand 35 may be detected by detecting an angle of the center stand 35 or a load occurred on the center stand 35. Various sensors as described above are configured as magnetic sensors or MEMS (Micro Electro Mechanical Systems) sensors, for example.

Figure 3:
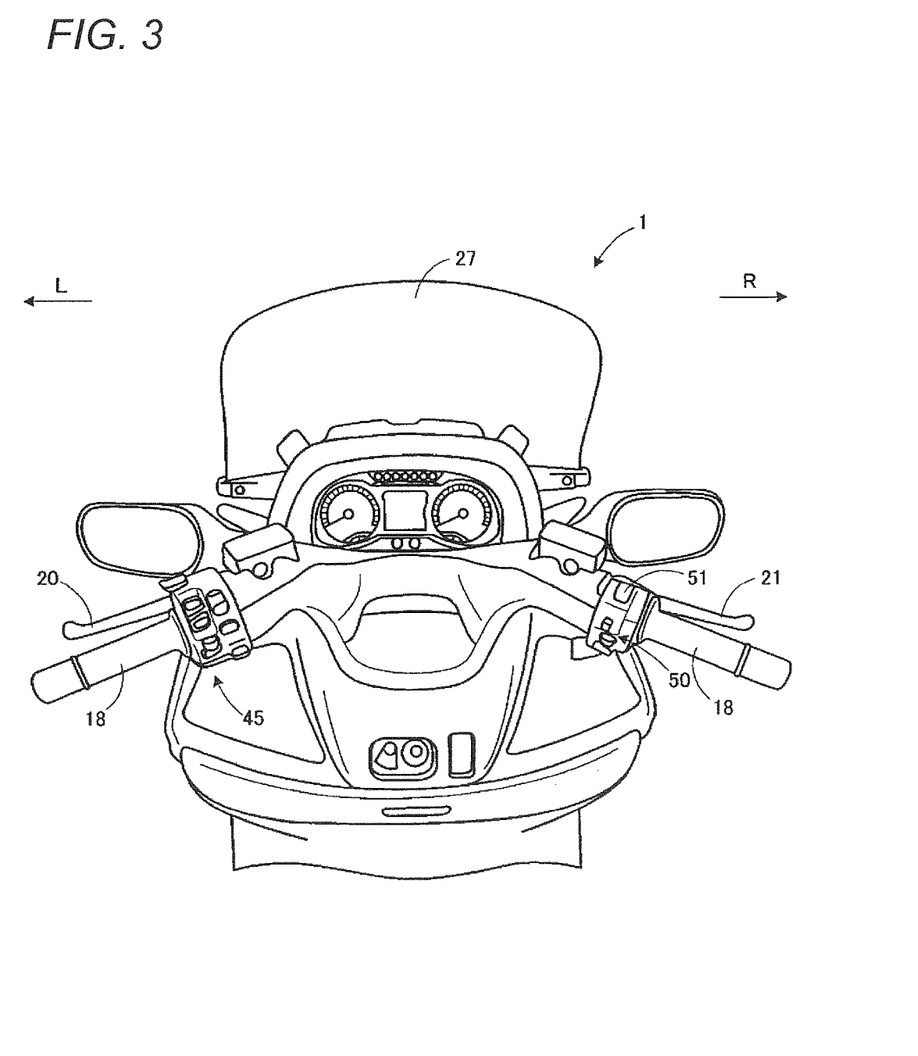
FIG. 3 is an enlarged view of the vicinity of handle bars of the automatic two-wheeled vehicle according to the present embodiment.
Figure 4:
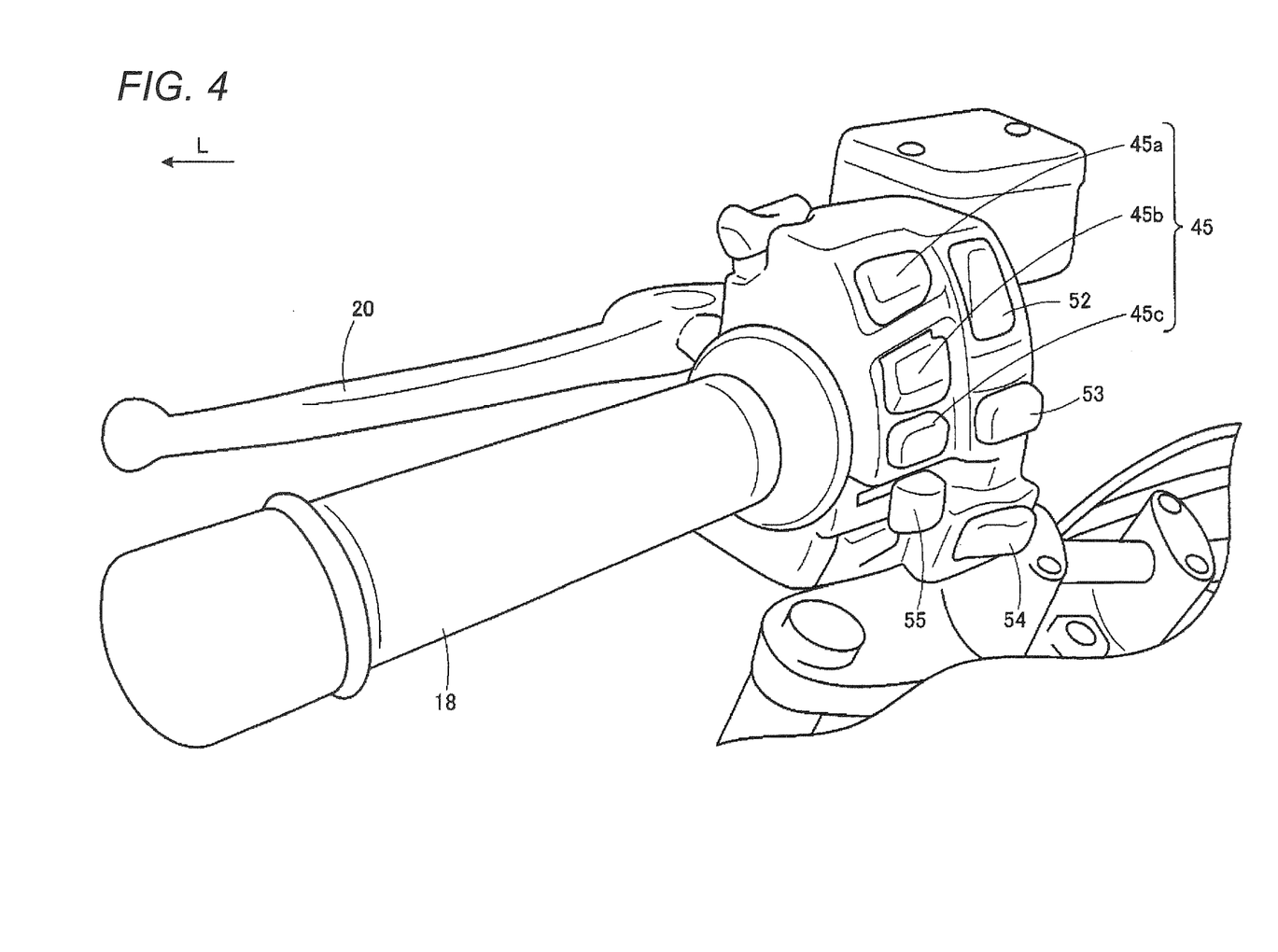
FIG. 4 is an enlarged view of the vicinity of a handle bar of the automatic two-wheeled vehicle according to the present embodiment.

Next, the parking assist selection switch according to the present embodiment will be described with reference to FIGS. 3 and 4. FIGS. 3 and 4 are enlarged views of the vicinity of handle bars of the automatic two-wheeled vehicle according to the present embodiment. In particular, FIG. 4 shows mainly a configuration of the handle bar on the left side. Meanwhile, arrangement of various switches shown in FIGS. 3 and 4 is not limited to a configuration described below, but can be appropriately modified.

As shown in FIGS. 3 and 4, the handle bar 18 on the left side of the vehicle is provided with a brake lever 20 for the rear wheel 19 (see FIG. 1) and the handle bar 18 on the right side of the vehicle is provided with a brake lever 21 for the front wheel 17 (see FIG. 1). The right handle bar 18 forms a throttle for adjusting an accelerator opening degree. Also, according to the present embodiment, the right handle bar 18 is provided with an engine start switch 50 and a kill switch 51. On the other hands, the left handle bar 18 is provided with various switches, such as the parking assist selection switch 45.

As shown in FIG. 4, the left handle bar 18 is provided with, a headlamp changeover switch 52, a power mode changeover switch 53, a drive manual changeover switch 54, and a winker switch 55, in addition to the parking assist selection switch 45. The parking assist selection switch 45 forms a changeover switch for changing over a control mode for the motor 25 (see FIG. 1) to a normal traveling mode or an assist mode. Control modes for the motor 25 will be described below. The parking assist selection switch 45 has a forward movement switch 45a, a backward movement switch 45b and a stop switch 45c.

The forward movement switch 45a causes the motor 25 to drive the front wheel 17 to be rotated forward, thereby enabling a forward movement of the vehicle. Meanwhile, this operation is different from a forward movement caused by operation of the throttle in the normal traveling mode. The backward movement switch 45b causes the motor 25 to drive the front wheel 17 to be rotated reverse, thereby enabling a backward movement of the vehicle. The stop switch 45c forces driving of the motor 25, which is driven by operating the forward movement switch 45a or backward movement switch 45a, to be stopped, and also changes over the control mode for the motor 25 to the normal traveling mode.

The headlamp changeover switch 52 changes over the headlamp 26 (see FIG. 1) to a low beam state or a high beam state. The power mode changeover switch 53 adjusts a driving power of the rear wheel 19 in a drive mode. The drive manual changeover switch 54 changes over a travelling mode to a drive mode or a manual mode.

The parking assist system 40 according to the present embodiment has the normal traveling mode and the assist mode as the control modes for the motor 25. In the normal traveling mode, operation of the throttle causes an engine rotation speed to be increased or a driving power of the rear wheel 19 to be increased, thereby accelerating the vehicle. On the other hand, in the assist mode, the front wheel 17 is allowed to be driven forward or backward by the parking assist selection switch 45.

When no operation of the forward movement switch 45a or backward movement switch 45b is performed in the parking assist selection switch 45, the control mode for the motor 25 is set to the normal traveling mode. Also, when operation of the forward movement switch 45a or backward movement switch 45b is performed, the control mode for the motor 25 is changed over to the assist mode. In the assist mode, the motor 25 is driven only while the forward movement switch 45a is operated, so that the front wheel 17 is driven to be rotated forward and thus the vehicle is moved forward. Also, the motor 25 is driven only while the backward movement switch 45b is operated, so that the front wheel 17 is driven to be rotated reverse and thus the vehicle is moved backward. Meanwhile, a speed of the vehicle during forward or backward movement in the assist mode is preferably adjusted so that a limit thereof is a speed (e.g., 5 km/h) which allows the occupant alighted from the vehicle to move the vehicle while operating the handle bars 18.

Further, in the assist mode, the operation of driving the front wheel 17 is not limited to the above configuration. For example, the motor 25 may be driven by operating the forward movement switch 45a and then operating the throttle, or the motor 25 may be driven by operating the backward movement switch 45b and then operating the throttle. Also, a driving power of the motor 25 in the assist mode is adjusted by operating the brake lever 20 for the rear wheel 19. In this case, depending on an operation amount of the brake lever 20, a brake for the rear wheel 19 can be activated, but also a driving power of the motor 25 for driving the front wheel 17 can be reduced. In addition, the driving power of the motor 25 may be adjusted by operating the brake lever 21 for the front wheel 17.

Figure 5:
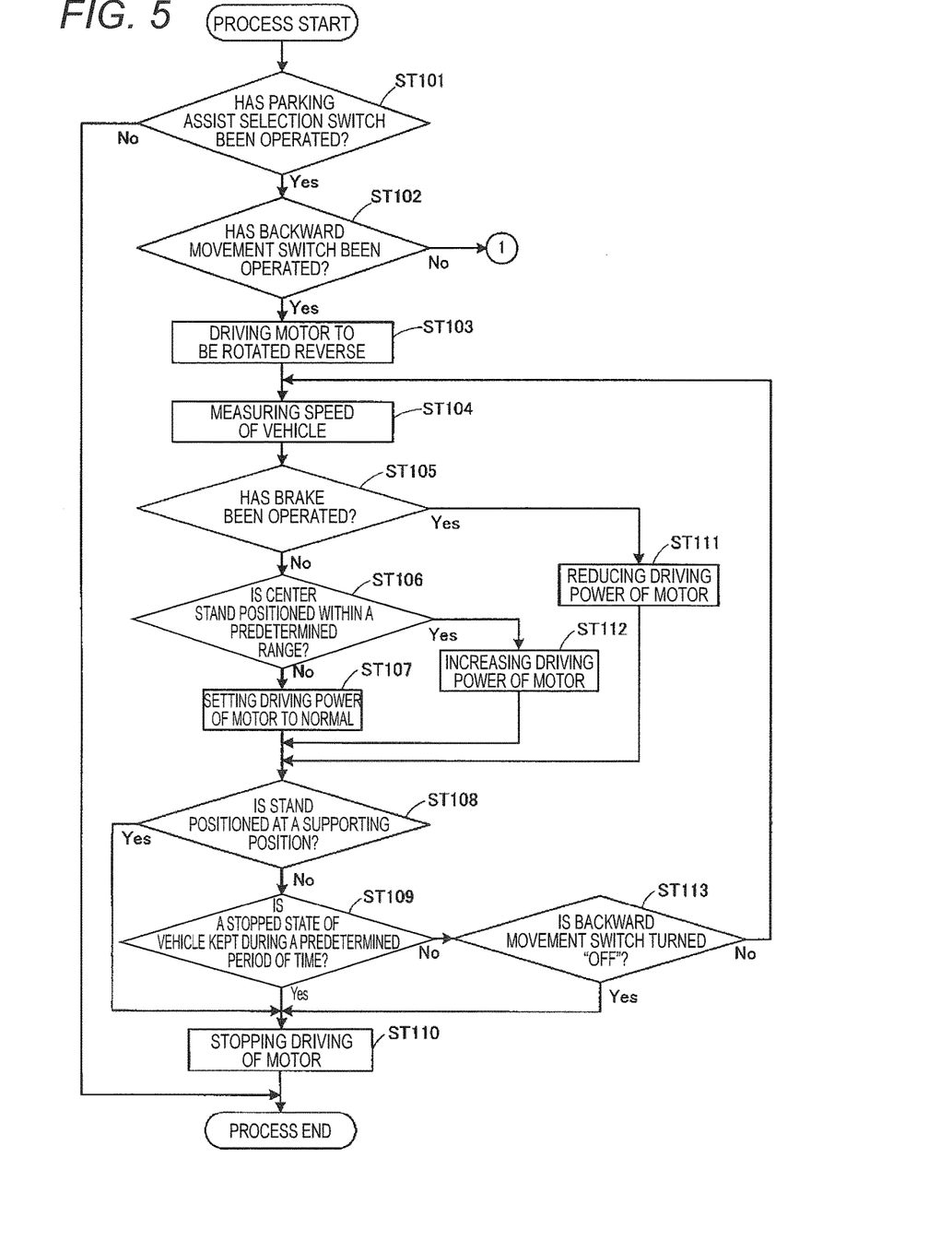
FIG. 5 is a flow chart of the parking assist system according to the present embodiment.
Figure 6:
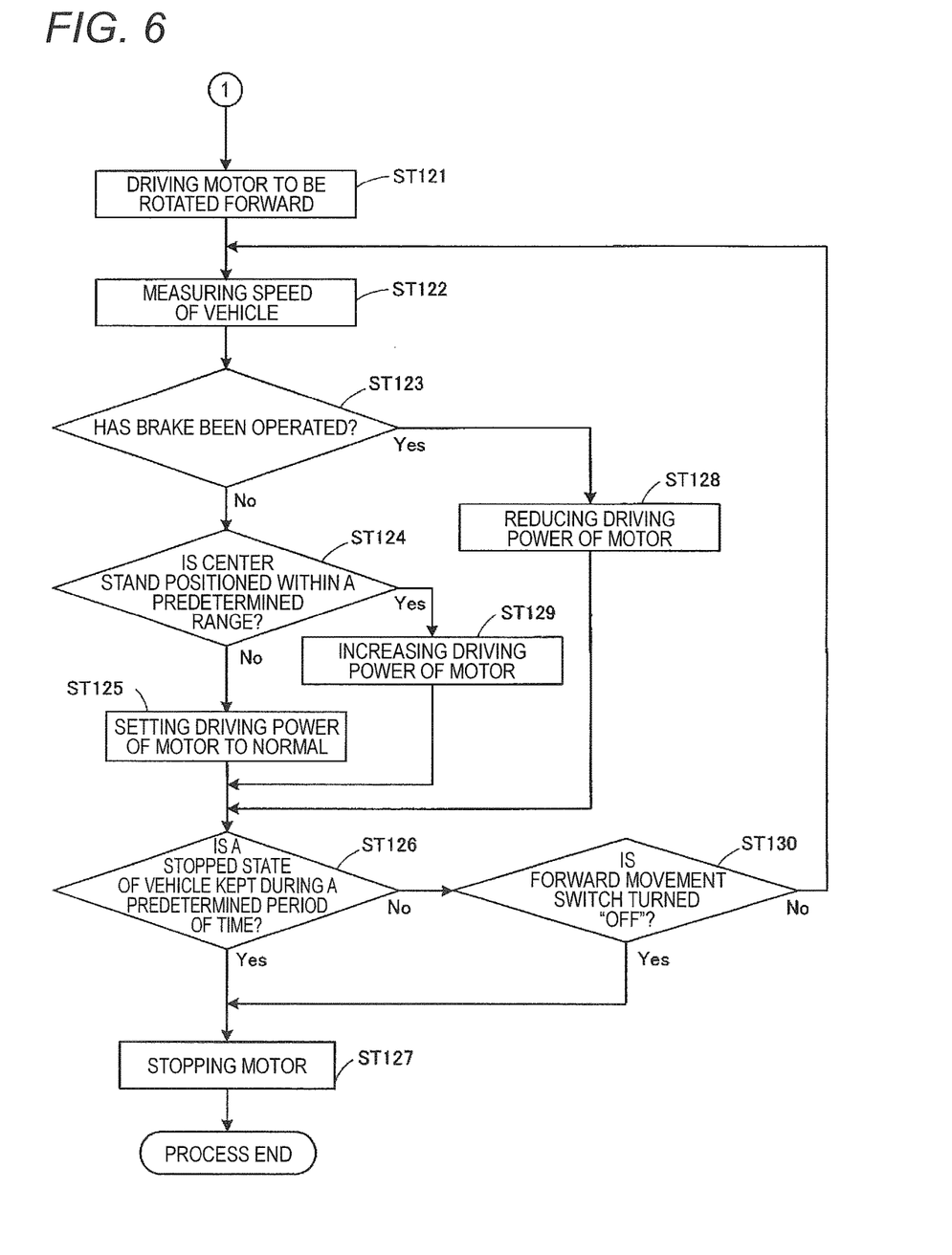
FIG. 6 is a flow chart of the parking assist system according to the present embodiment.

Next, a control flow when operation of the center stand is assisted will be described with reference to FIGS. 5 and 6. FIGS. 5 and 6 are flow charts of the parking assist system according to the present embodiment. Meanwhile, in the following description, it is assumed that control for the parking assist system is performed by the motor control unit shown in FIG. 2. Also, although motor controls when the vehicle is supported by the center stand or when supporting is released will be described in the following description, the present invention is not limited to such a configuration. For example, the present invention may be applied to controls when adjusting handling of the vehicle.

As shown in FIG. 5, if the process is started, whether or not the parking assist selection switch 45 (either of the forward movement switch 45a and backward movement switch 45b (see FIGS. 2 and 3)) has been operated is first decided (Step ST101). If the parking assist system 45 has not been operated (Step ST101: No), it is decided that the current control mode is the normal traveling mode, and thus the control is ended. If the parking assist selection switch 45 (either of the forward movement switch 45a and backward movement switch 45b (see FIGS. 2 and 3)) has been operated (Step ST101: Yes), whether or not the backward movement switch 45b has been operated is decided (Step ST102). Meanwhile, in the following description, it is assumed that when the vehicle is supported by the center stand 35 (see FIG. 1), the backward movement switch 45b is operated. Also, it is assumed that when supporting the vehicle by the center stand 35 is released, the forward movement switch 45a is operated.

If the backward movement switch 45b has been operated (Step ST102: Yes), the front wheel 17 is driven reverse by the motor 25 (see FIG. 1), so that the vehicle is moved backward (Step ST103). Alternatively, as described above, the motor 25 may be operated only while the backward movement switch 45b is pushed down. In addition, the motor 25 may be configured to be driven by pushing the backward movement switch 45b and then operating the throttle. A case where the backward movement switch 45b has not been operated (Step ST102: No) will be described below.

After Step ST103, a speed of the vehicle is measured by the speed sensor 47 (see FIG. 2) and also counting of time is initiated (Step ST104). The vehicle speed and time are used in deciding whether or not driving of the motor 35 has to be stopped in Step ST109 as described below. Subsequently, whether or not the brake lever 20 (see FIG. 1) has been operated is decided (Step ST105). If the brake lever 20 has not been operated (Step ST105: No), whether or not the center stand 35 of the vehicle is operated and thus is positioned with a predetermined range (e.g., a range from when the center stand 35 starts to come in contact with the ground surface until the center stand 35 is positioned at a supporting position) is decided (Step ST106). Whether or not the center stand 35 is positioned within the predetermined range is decided by a position of the center stand 35 detected by the center stand sensor 49.

If the center stand 35 is not positioned with the predetermined range (Step ST106: No), a driving power of the motor 25 is set to a normal condition (Step ST107) and then whether or not the vehicle has been supported by the center stand 35 is decided (Step ST108). Herein, when the center stand 35 is positioned at the supporting position, it is assumed that the vehicle has been supported by the center stand 35. Meanwhile, the supporting position of the center stand 35 will be described below.

If the center stand 35 is positioned at the supporting position (Step ST108: Yes), driving of the motor 25 is stopped (Step ST110). If not positioned at the supporting position (Step ST108: No), whether or not the vehicle has been kept stopped during a predetermined period of time is decided based on the measured vehicle speed and the counted time in Step ST104 (Step ST109).

If the vehicle has been kept stopped during the predetermined period of time (Step ST109: Yes), it is decided that operation of the center stand 35 is finished and no assist is required, and as a result, driving of the motor 25 is stopped (Step ST110). Then, the control mode is changed over from the assist mode to the normal traveling mode, and also the process is ended. If the vehicle has not been kept stopped during the predetermined period of time (Step ST109: No), whether or not the backward movement switch 45b is turned off is decided (Step ST113). If the backward movement switch 45b is on (Step ST113: No), the process returns to Step ST104. On the other hand, if the backward movement switch 45b is off (Step ST113: Yes), driving of the motor 25 is stopped (Step ST110). Meanwhile, the predetermined period of time can be appropriately changed.

In Step ST105, if the brake lever 20 has been operated (Step ST105: Yes), a driving power of the motor 25 is reduced (Step ST111) and the process procedures to Step ST108. Also, in Step ST106, if the center stand 35 is positioned within the predetermined range (Step ST106: Yes), the driving power of the motor 25 is increased (Step ST112). Therefore, operation of the center stand 35 is assisted, and as a result, a burden when the rear wheel 19 is lifted up is reduced. Then, the process proceeds to Step ST108.

In Step ST102, in a case where the backward movement switch 45b has not been performed, for example, in a case where the forward movement switch 45a has been performed (Step ST102: No), as shown in FIG. 6, the front wheel 17 is driven forward by the motor 25, so that the vehicle is moved forward (Step ST121). Alternatively, as described above, the motor 25 may be operated only while the forward movement switch 45a is pushed down. In addition, the motor 25 may be configured to be driven by pushing the forward movement switch 45a and then operating the throttle.

After Step ST121, a speed of the vehicle is measured and also counting of time is initiated (Step ST122). Subsequently, whether or not the brake lever 20 (see FIG. 1) has been operated is decided (Step ST123). If the brake lever 20 has not been operated (Step ST123: No), whether or not the center stand 35 is positioned with a predetermined range (e.g., during a period of time from when the center stand 35 is positioned at the supporting position until the center stand 35 does not come in contact with the ground surface is decided (Step ST124).

If the center stand 35 is not positioned with the predetermined range (Step ST124: No), a driving power of the motor 25 is set to a normal condition (Step ST125) and then whether or not the vehicle has been kept stopped during a predetermined period of time is decided based on the measured vehicle speed and the counted time in Step ST122 (Step ST126). If the vehicle has been kept stopped during the predetermined period of time (Step ST126: Yes), it is decided that operation of the center stand 35 is finished and no assist is required, and as a result, driving of the motor 25 is stopped (Step ST127). Then, the control mode is changed over from the assist mode to the normal traveling mode, and also the process is ended. If the vehicle has not been kept stopped during the predetermined period of time (Step ST126: No), whether or not the forward movement switch 45a is turned off is decided (Step ST130). If the forward movement switch 45a is on (Step ST130: No), the process returns to Step ST122. On the other hand, if the forward movement switch 45a is off (Step ST130: Yes), driving of the motor 25 is stopped (Step ST127).

In Step ST123, if the brake lever 20 has been operated (Step ST123: Yes), a driving power of the motor 25 is reduced (Step ST128) and the process procedures to Step ST126. Also, in Step ST124, if the center stand 35 is positioned within the predetermined range (Step ST124: Yes), the driving power of the motor 25 is increased (Step ST129). Therefore, operation of the center stand 35 is assisted, and as a result, a burden when supporting the vehicle by the center stand 35 is released is reduced. Then, the process proceeds to Step ST126.

In this way, according to the present invention, the driving power of the motor 25 can be adjusted depending on the control mode for the motor 25 and the position of the center stand 35. As a result, the driving power of the motor 25 can be increased at a timing at which it is expected that the occupant will have a large burden when operating the center stand 35. Thus, the burden to the occupant can be reduced. Also, when no assist by the motor 25 is required, the motor 25 is reduced in driving power or stopped, thereby preventing a waste of electric power.

Figure 7A:
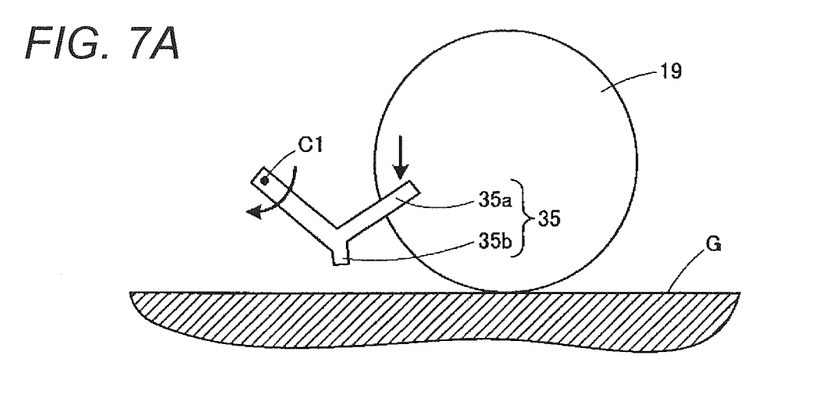
FIGS. 7A to 7C are views explaining operations when supporting a vehicle by a center stand according to the present embodiment.
Figure 7B:
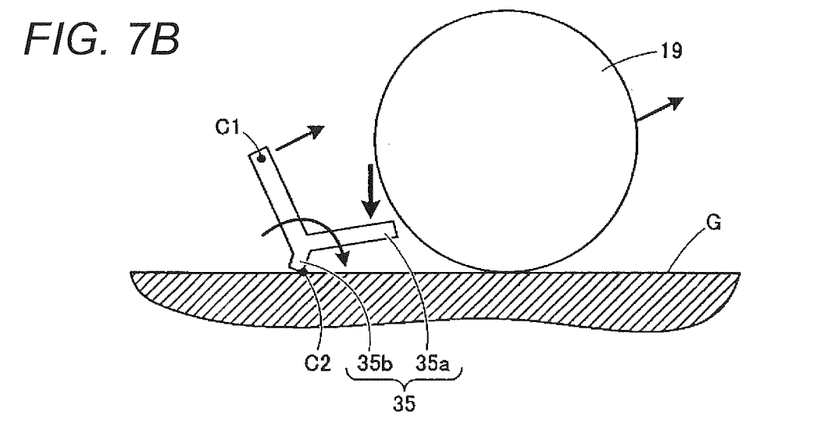
Figure 7C:
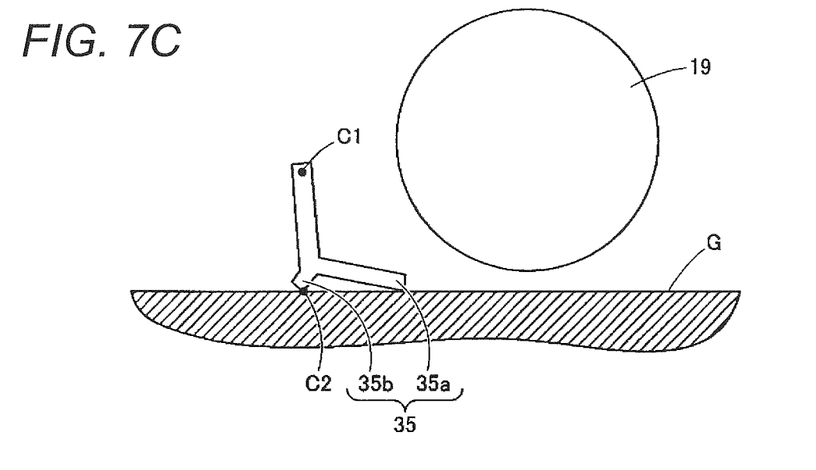

Next, operations when the center stand is operated will be described with reference to FIGS. 7A to 7C. FIGS. 7A to 7C are views explaining operations when supporting the vehicle by the center stand according to the present embodiment. In FIGS. 7A to 7C, only the rear wheel and the center stand are schematically shown for convenience of explanation. FIG. 7A is a view showing a state where supporting of the vehicle is released. FIG. 7B is a view showing a state where the center stand is being operated. FIG. 7C is a view showing a state where the vehicle is supported. Also, in the following description, among the components of the center stand 35 described in FIG. 1, the bent portion 35a is referred to as a trod portion 35a and the protrusion portion 35b is referred to as a support portion 35b.

As shown in FIG. 7A, the rear wheel 19 is in contact with the ground surface G and supporting of the vehicle by the center stand 35 is released. Also, the center stand 35 is spaced from the ground surface G. A position of the center stand 35 at this time is referred to as a released position. When the center stand 35 is operated to support the vehicle, a distal end of the trod portion 35*a* is first trod down with a foot. The center stand 35 is pivoted about a base end C1 thereof, which is attached on the vehicle body, as a fulcrum, and thus as shown in FIG. 7B, a distal end of the support portion 35*b* is abutted with the ground surface G. A position of the center stand 35 at this time is referred to as an intermediate position.

Typically, when the center stand 35 is operated, the occupant tries to lift up the rear wheel 19 from the ground surface G while applying his weight to the trod portion 35*a* in the state shown in FIG. 7B. Specifically, if the trod portion 35 is further trod down and moved downward, the base end C1 of the center stand 35 is moved rearward about a contact portion C2 between the support portion 35*b* and the ground surface G as a fulcrum. At this time, the entire vehicle is slightly lifted up and also moved rearward, and as a result, the rear wheel 19 is slightly floated above the ground surface G. Then, as shown in FIG. 7C, the vehicle is supported by the center stand 35. A position of the center stand 35 at this time is the supporting portion.

In this way, at a timing at which the state of FIG. 7B is transited to the state of FIG. 7C, i.e., when the center stand 35 is transited from the intermediate position (supporting start position) to the supporting position, a larger burden is applied to the occupant. Therefore, according to the present embodiment, an output of the motor 25 is increased when the center stand 35 is transited from the intermediate position (supporting start position) to the supporting position. Thus, a driving power of the motor 25 can be increased at a timing at which a larger force is required during a motion for supporting the vehicle by the center stand 35, thereby allowing a suitable assist to be provided. In particular, a larger operating force is required during a range from the intermediate position (supporting start position), at which the center stand 35 comes in contact with the ground surface, to a position, at which the center stand 35 is erected and thus the rear wheel 19 is lifted up highest, and accordingly, it is more effective to increase the driving power of the motor 25 during such a range.

Although operations when the vehicle is supported by the center stand 35 are described in FIGS. 7A to 7C, the present invention is not limited to that. The present invention can be also applied to operations when a state where the vehicle is supported by the center stand 35 is released. When supporting of the vehicle is released from the state (supporting position) shown in FIG. 7C, the occupant has to push the entire vehicle forward while applying his weight toward the front side of the vehicle.

Namely, when the center stand 35 is transited from the supporting position to the intermediate position (released position), a larger burden is applied to the occupant. Therefore, according to the present embodiment, an output of the motor 25 is increased when the center stand 35 is transited from the supporting position to the intermediate position (released position). Thus, a driving power of the motor 25 can be increased at a timing at which a larger force is required during a motion for releasing supporting of the vehicle by the center stand 35, thereby allowing a suitable assist to be provided. In particular, a larger operating force is required during a range from the supporting position of the center stand 35 to a position, at which the center stand 35 is erected and thus the rear wheel 19 is lifted up highest, and accordingly, it is more effective to increase the driving power of the motor 25 during such a range.

As described above, according to the parking assist system 40 of the present embodiment, when it is desired to park a vehicle, the parking assist selection switch 45 can be switched to drive the front wheel 17. Thus, for example, forward and backward movements of the vehicle upon parking can be assisted by the motor 25. As a result, a burden to an occupant can be reduced. Also, an output of the motor 25 is controlled depending on an operation amount of the brake lever 20, and accordingly, a driving power of the motor 25 can be adjusted by a typical operation of the brake lever 20. Thus, operations of moving the vehicle forward or backward or stopping the vehicle can be easily performed.

Also, according to the present embodiment, a position of the center stand 35, which is configured to support the vehicle while floating the rear wheel 19, is detected by the center stand sensor 49, and an output of the motor 25 is controlled depending on the detected result. In this case, because a driving power of the motor 25 is adjusted depending on a position of the center stand 35, a parking motion of an occupant can be assisted depending on a force required to support the vehicle by the center stand 35.

Further, according to the present embodiment, a speed sensor 47 is provided to detect a speed of the vehicle, and if a state where the vehicle speed detected by the speed sensor 47 is lower than a predetermined value is kept during a predetermined period of time, the output of the motor 25 is stopped. As a result, the motor 25 can be automatically stopped when the motor 25 does not need to be driven. Thus, it is possible to prevent an overload from being exerted on the motor 25 or a battery from being wasted.

Further, according to the present embodiment, the parking assist selection switch 45 is provided to be concentrated on the left side of the vehicle. Typically, when the assist mode is used, the occupant performs operations of the handle on the left side of the vehicle after alighting from the vehicle. For this reason, the parking assist selection switch 45 is provided on the left side of the vehicle, thereby facilitating operations for forward and backward movements.

Meanwhile, the present invention is not limited to the forgoing embodiments, and accordingly, various modifications thereof can be made. Sizes, shapes and the like in the foregoing embodiments are not limited to those as shown in the accompanying drawings, but can be appropriately modified within the scope in which the effects of the present invention can be exhibited. In addition, any appropriate modifications thereof can be made without departing from the spirit and scope of the invention.

For example, although in the foregoing embodiments, the motor 25 for driving the front wheel 17 is configured to be activated during the assist mode, the present invention is not limited to such a configuration. The motor 25 may also assist to drive the front wheel 17 during the normal traveling mode.

Also, although in the foregoing embodiments, a case where the vehicle is parked on the flat ground surface G is illustrated by way of example, the present invention is not limited to that. For example, the ground surface G, on which the vehicle is to be parked, may be inclined. In this case, an inclination of the ground surface G may be detected by an inclination sensor, such as a gyro sensor (not shown). Thus, even in the case of the inclined ground surface, a suitable assist can be provided.

Further, although in the foregoing embodiment, an example where the parking assist system 40 assists to operate the center stand is illustrated, the present invention is not limited to that. For example, the parking assist system 40 may be also applied to adjust handling of the vehicle when the vehicle is steered using forward and backward movements upon parking and the like.

As described above, the present invention has effects that a burden to an occupant upon parking can be reduced, and in particular, is useful for a parking assist system to be applied to a vehicle having a center stand.

What is claimed is:

1. A parking assist system, comprising:
a motor configured to drive a front wheel;
a motor control device configured to control an output of the motor; and
a changeover switch configured to change over a control mode for the motor to an assist mode different from a normal traveling mode,
wherein the motor control device is configured to control the output of the motor depending on operation of the changeover switch at the assist mode,
wherein the parking assist system is used in a vehicle having a center stand configured to support the vehicle while floating a rear wheel thereof and further comprises a center stand position detection unit configured to detect a position of the center stand, and
wherein the motor control device is configured to control the output of the motor depending on the detected position result of the center stand position detection unit.

2. The parking assist system according to claim 1, wherein the motor control device is configured to increase the output of the motor when the center stand is transited from a supporting start position, at which supporting of the vehicle is started, to a supporting position, at which the vehicle is supported.

3. The parking assist system according to claim 1, wherein the motor control device is configured to increase the output of the motor when the center stand is transited from a supporting position, at which the vehicle is supported, to a released position, at which supporting of the vehicle is released.

4. The parking assist system according to claim 1, further comprising a speed sensor for detecting a speed of the vehicle,
wherein the motor control device is configured to stop the output of the motor, if a state where the vehicle speed detected by the speed sensor is lower than a predetermined value is kept during a predetermined period of time.

* * * * *